(12) United States Patent
Bailey

(10) Patent No.: US 11,943,247 B2
(45) Date of Patent: *Mar. 26, 2024

(54) SYSTEMS AND METHODS FOR DETECTION AND MITIGATION OF MALICIOUS ENCRYPTION

(71) Applicant: OPEN TEXT INC., Menlo Park, CA (US)

(72) Inventor: Daniel Vernon Bailey, Menlo Park, CA (US)

(73) Assignee: OPEN TEXT INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,257

(22) Filed: Nov. 7, 2022

(65) Prior Publication Data
US 2023/0084558 A1 Mar. 16, 2023

Related U.S. Application Data

(63) Continuation of application No. 16/839,377, filed on Apr. 3, 2020, now Pat. No. 11,516,236, which is a continuation of application No. 15/727,463, filed on Oct. 6, 2017, now Pat. No. 10,637,879.

(51) Int. Cl.
H04L 9/40 (2022.01)
G06F 21/55 (2013.01)
H04L 9/14 (2006.01)

(52) U.S. Cl.
CPC ........ *H04L 63/1425* (2013.01); *G06F 21/554* (2013.01); *H04L 9/14* (2013.01); *H04L 63/0428* (2013.01); *H04L 63/1416* (2013.01); *H04L 63/1466* (2013.01)

(58) Field of Classification Search
CPC ... H04L 63/1425; H04L 9/14; H04L 63/0428; H04L 63/1416; H04L 63/1466; G06F 21/554

See application file for complete search history.

(56) References Cited

U.S. PATENT DOCUMENTS

| | | | | |
|---|---|---|---|---|
| 9,516,053 | B1* | 12/2016 | Muddu | G06F 3/0484 |
| 10,050,982 | B1* | 8/2018 | Guerra | H04L 63/1416 |
| 2005/0281291 | A1* | 12/2005 | Stolfo | G06F 21/554 |
| | | | | 370/506 |
| 2006/0015630 | A1* | 1/2006 | Stolfo | G06F 21/563 |
| | | | | 709/230 |
| 2010/0054278 | A1* | 3/2010 | Stolfo | G06F 21/552 |
| | | | | 370/474 |
| 2013/0174255 | A1* | 7/2013 | Stolfo | G06F 21/552 |
| | | | | 726/22 |

(Continued)

Primary Examiner — Yonas A Bayou
(74) Attorney, Agent, or Firm — Sprinkle IP Law Group

(57) ABSTRACT

The present disclosure describes systems and methods for detection and mitigation of malicious encryption. A security agent on an infected computing device may monitor data writes to disk, memory, or network transmission buffers for strings that may represent encryption keys or moduli. The security agent may apply one or more techniques to decode and parse the string to either identify or extract the keys, or rule out the string as containing an encryption key or modulus. If a key is identified, or its presence cannot be excluded, then the security agent may generate an alert and take mitigation actions.

20 Claims, 10 Drawing Sheets

(56) References Cited

U.S. PATENT DOCUMENTS

| | | | |
|---|---|---|---|
| 2014/0196147 A1* | 7/2014 | Stolfo | H04L 63/1425 |
| | | | 726/23 |
| 2015/0180895 A1* | 6/2015 | Stolfo | G06F 21/55 |
| | | | 726/22 |
| 2016/0330224 A1* | 11/2016 | Stolfo | H04L 63/029 |
| 2017/0034189 A1* | 2/2017 | Powell | H04L 63/145 |
| 2017/0093886 A1* | 3/2017 | Ovcharik | H04L 9/002 |
| 2017/0279601 A1* | 9/2017 | Yamane | H04L 9/0819 |
| 2019/0068362 A1* | 2/2019 | Anderson | G06N 5/025 |

\* cited by examiner

SYSTEMS AND METHODS FOR DETECTION AND MITIGATION OF MALICIOUS ENCRYPTION

CROSS-REFERENCE TO RELATED APPLICATION(S)

This patent application is a continuation of, and claims a benefit of priority under 35 U.S.C. § 120 from U.S. patent application Ser. No. 16/839,377, filed Apr. 3, 2020, issued as U.S. Pat. No. 11,516,236, entitled "SYSTEMS AND METHODS FOR DETECTION AND MITIGATION OF MALICIOUS ENCRYPTION," which is a continuation of, and claims a benefit of priority under 35 U.S.C. § 120 from U.S. patent application Ser. No. 15/727,463, filed Oct. 6, 2017, issued as U.S. Pat. No. 10,637,879, entitled "SYSTEMS AND METHODS FOR DETECTION AND MITIGATION OF MALICIOUS ENCRYPTION," both of which are hereby fully incorporated by reference herein for all purposes.

TECHNICAL FIELD

The present application relates to systems and methods for detecting and mitigating the effects of malicious encryption, such as that performed by malware or ransomware.

BACKGROUND OF THE RELATED ART

In some implementations of malicious software programs or malware, sometimes referred to as ransomware, attacking programs may attempt to encrypt one or more user 10 and/or system files on a victim computing device and delete the original plaintext versions of the files. Ransomware typically generates or displays a ransom note demanding payment in exchange for a decryption key for one or more files. As brute force decryption may require significant time and resources, many victims end up paying the demanded ransom order to regain access to their files.

Countermeasures for malicious encryption may include routine backup of files. After all, if the victim can simply restore from backup, then no files are lost. However, if backups are not frequent enough, some data may be lost. Furthermore, in some implementations, ransomware has the ability to encrypt attached storage, such as backup storage files, obviating this solution.

Another countermeasure is a family of techniques to prevent the attacker's code from running in the first place. Modern operating systems take pains to offer anti-malware scanners that examine program code, sandboxes to prevent the attacker's code from directly reading or writing to disk, and regular patch updates to prevent attackers from introducing code using other means including software vulnerabilities. However, a well disguised attack agent may be undetected by such scanners.

Still another family of countermeasures attempts to identify files that are being encrypted, for example, by identifying writes to files that result in significant increases in entropy. In one such implementation described in U.S. Publication No. 2017/0093886 to Ovcharik et al., an analyzer "calculates entropy of the overwritten file segment and calculates convergence for the entropy of the original and the overwritten file segment . . . [I]f the convergence does not exceed a given threshold, then . . . further file operations on the part of the user's computer . . . are allowed." A similar countermeasure may attempt to identify unusual behaviors, such as copying large numbers of files in a short time frame and deleting the originals. The MWR Labs whitepaper, "A behavioural-based approach to ransomware detection," by Daniel Nieuwenhuizen, notes that, "[i]n behavioural analysis, the behavioural characteristics of the executable is known as it is being observed in real-time, and inferences is made by an inductive decision algorithm on the threat level . . . . Behavioural-based analysis has been found to be highly effective for crypto ransomware detection because it exhibits core behavioural traits necessary for a data encryption attack that does not change from variant to variant or family to family." However, in all such implementations, at least some file encryption may have occurred, limiting the amount of mitigation that may be performed.

SUMMARY OF THE DISCLOSURE

The present disclosure describes systems and methods for detection and mitigation of malicious encryption. A security agent on an infected computing device may monitor data writes to disk, memory, or network transmission buffers for strings that may represent encryption keys or moduli. The security agent may apply one or more techniques to decode and parse the string to either identify or extract the keys, or rule out the string as containing an encryption key or modulus. If a key is identified, or its presence cannot be excluded, then the security agent may generate an alert and take mitigation actions.

BRIEF DESCRIPTION OF THE DRAWINGS

In the drawings, like reference numbers generally indicate identical, functionally similar, and/or structurally similar elements.

DETAILED DESCRIPTION

The following description in conjunction with the above-reference drawings sets forth a variety of embodiments for exemplary purposes, which are in no way intended to limit the scope of the described methods or systems. Those having skill in the relevant art may modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Prior to describing the disclosed methods and systems, a detailed explanation of exemplary encryption-based malicious ransomware attacks will be described with reference FIGS. 1A and 2. In some implementations of malicious software programs or malware, sometimes referred to as ransomware, the programs may attempt to encrypt one or more user and/or system files on a victim computing device and delete the original plaintext versions of the files. Ransomware typically generates or displays a ransom note demanding payment in exchange for a decryption key for one or more files. As brute force decryption may require significant time and resources, many victims end up paying in order to regain access to their files.

In other, potentially worse implementations, no ransom note is provided and files may simply be encrypted with no easy (albeit expensive) way to obtain the encryption key. In a similar implementation, ransomware typically communicates with a host server, which may be referred to as a command and control server. The host server may provide decryption keys to victim computers, upon payment of ransom. However, if the command and control server is shut down or blocked or otherwise inaccessible while the malware is still infecting computing devices, victims may have no ability to pay ransom requirements and/or obtain decryption keys.

"Malicious" encryption, as used herein, may refer to any act of encryption of user or system data not directed by or desired by a user of a device, and may be done for the purpose of obtaining a ransom, to annoy or frustrate, for corporate espionage or sabotage, or any other such purpose. Although referred to as "malicious", explicit malice need not be present; rather, the encryption may be simply performed against the user's interests, with no easy decryption method.

Figure 1A:
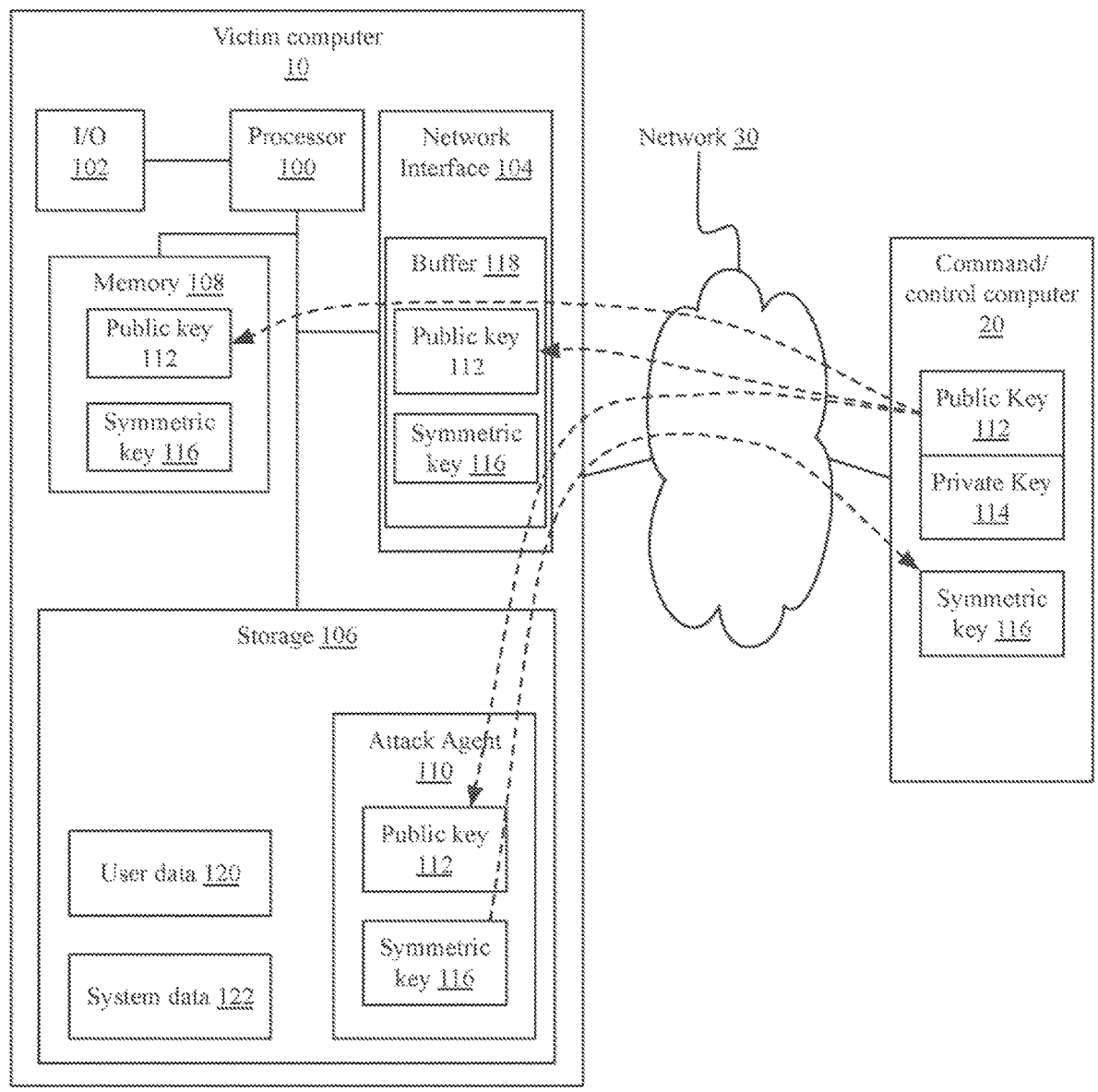
FIG. 1A is a block diagram of a prior art system potentially vulnerable to ransomware attacks.

FIG. 1A is a block diagram of a prior art system potentially vulnerable to ransomware attacks. A computing device 10, sometimes referred to as a client computing device, victim computing device, or other similar term, may comprise a laptop computer, desktop computer, portable computer, tablet computer, wearable computer, server, workstation, appliance, or any other such device or devices. In some implementations, computing device 10 may comprise a virtual computing device executed by one or more physical computing devices, e.g. via a hypervisor. Computing device 10 may be any type and form of computing device having or maintaining data storage, including without limitation personal computers of users, servers shared by groups of users, or equipment having integrated computing devices that are not typically considered computers (e.g. medical equipment, self-driving cars, automation systems, automatic teller machines, smart televisions, etc.).

Computing device 10 may communicate with a command and control computer 20, sometimes referred to as a host computer, attacker computer, C&C server, or by other similar terms. C&C computer 20 may comprise a laptop computer, desktop computer, portable computer, tablet computer, wearable computer, server, workstation, appliance, or any other such device or devices. In some implementations, C&C computer 20 may comprise a virtual computing device executed by one or more physical computing devices, e.g. via a hypervisor. C&C computer 20 may be any type and form of computing device capable of exchanging keys with a victim computer 10 via a network 30.

Network 30 may comprise any type and form of network or networks, including a Local Area Network (LAN), Wide Area Network (WAN) or the Internet. Network 30 may comprise a variety of connections including, but not limited to, standard telephone lines, LAN or WAN links (e.g., Ethernet, T1, T3, 56 kb, X.25), broadband connections (e.g., ISDN, Frame Relay, ATM, etc.), wireless connections, (802.11a/b/g/n/ac, Bluetooth), cellular connections, satellite connections, or some combination of any or all of the above.

A network 30 may comprise one or more intermediary devices, including switches, hubs, firewalls, gateways, access points, or other such devices. In some implementations, network 30 may be homogeneous, such as a plurality of wired links of the same type, while in other implementations, network 30 may be heterogeneous (e.g. a cellular link to a wired link to a satellite gateway to a wireless gateway, etc.).

Victim computer 10 (and C&C computer 20, though not illustrated) may comprise one or more processors 100, one or more input/output interface(s) 102, one or more network interfaces 104, one or more storage devices 106, and/or one or more memory units 108. Processor 100 may comprise logic circuitry that responds to and processes instructions fetched from memory 108 and/or storage 106. The processor 100 may comprise a microprocessor unit, such as: a general purpose microprocessor as sold by Intel Corporation of Santa Clara, Calif. or Advanced Micro Devices of Sunnyvale, Calif.; a specialty microprocessor as sold by Qualcomm Inc. of San Diego, Calif. or Samsung Group of Samsung Town, Seoul, South Korea; or any other processor capable of executing programmed instructions and otherwise operating as described herein, or a combination of two or more single- or multi-core processors. Processor 100 may execute one or more items of executable logic, such as an attack agent 110 and/or security agent 124, discussed in more detail below. Processor 100 may also execute an operating system, applications, and/or other executable logic.

Client device 200 and/or C&C computer 20 may comprise one or more input or output interfaces 102, such as a keyboard, mouse, touchpad, touchscreen, microphone, camera, accelerometer, position tracker, joystick, or other such input devices; or a screen, audio speaker, video output, haptic output, or other such output device. Input and output interfaces 102 may be used to view and interact with a user interface, such as one provided by a security agent 124 or an operating system of the device.

A network interface 104 may comprise a wired interface such as an Ethernet interface of any speed including 10BASET, 100BASET, Gigabit Ethernet, or any other such speed, a universal serial bus (USB) interface, a power line interface, a serial interface, or any other type of wired interface. In other implementations, network interface 104 may comprise a wireless interface, such as a Bluetooth, Wireless USB, 802.11 (WiFi) interface, or cellular interface, or any other type and form of wireless interface. In some implementations, a network interface 104 may include both a wired and wireless interface, to provide additional flexibility, reliability, or bandwidth. Network interface 104 may include one or more layers of a network stack, including transport layer functions, Internet layer functions, physical layer functions and interfaces, or any other such functions or interfaces. Network interface 104 may communicate via a network 30 and/or one or more other networks, including a local area network (LAN) behind a gateway or network address translator (NAT) or other such device. Accordingly, the network interface 104 may have an IP address that is available to a wide area network (WAN, such as the Internet) or may be behind an appliance and have an IP address directly available only to the local network. Network 30 may be a LAN, a WAN, a cellular network, a terrestrial or satellite network, or any combination of these or other networks. Network interface 104 may be used to establish a connection to C&C computer 20, which may include a similar network interface 104 (not illustrated).

Client device 200 and/or C&C computer 20 may include a storage device 106, such as a hard drive, flash drive, hybrid drive, or any other type and form of data storage. Client device 200 and/or C&C computer 20 may also include a memory device 108, including random access memory (RAM), dynamic RAM (DRAM), cache memory, or any other such form of data storage. Memory 108 and storage 106 may store different types of data, including system files such as operating system executable files, libraries, a registry, user interface components, or other such data provided as part of or generated by an operating system of device 20. In some implementations, storage 106 may be considered non-volatile or long term storage, while memory 108 may be considered volatile or short term memory. For example, storage 106 may comprise a hard drive, while memory 108 may comprise RAM. Thus, memory 108 may be differentiated from storage 106 based on intended usage or functionality, or durability of stored data during unpowered periods.

Storage 106 may store user data files 120 and system data files 122. User data files 120 may comprise any type and form of user data files, including documents, photos, videos, audio recordings, spreadsheets, contact lists, calendars, mail archives, or any other type and form of user-specific data. Such user-specific data files 120 may be in any one of a variety of file formats, such as .doc, .txt, .jpeg, .pdf, and the like. System data files 122 may comprise any type and form of files or data other than the user data as described above, such as one or more system or application files, including executable applications, application specific libraries, templates, user interface components, settings or preferences files, application assets such as graphics or media, or any other type and form of application-related files in a variety of file formats. System data files 122 may include applications such as productivity or "office" applications, video games, web browsers including plug-ins or extensions, graphics or audio applications, as well as other system-specific files such as libraries, registry entries, etc., in a variety of file formats. In some implementations, ransomware may attack one or more of both user data files 120 and system data files 122; in other implementations, it may target one or more user data files 120 exclusively, rather than system data files 122, with the intent of encrypting user files but still allowing the device to run applications. In some implementations, this may reduce detectability, as many operating systems provide notifications of attempts to modify system files.

Although shown internal to computing device 10, in many implementations, storage 106 may be internal, external, or a combination of internal and external, including external hard drives or flash drives, network drives, or other such storage devices.

Storage 106 may store an attack agent 110, sometimes referred to as malware, ransomware, a virus, a Trojan (also referred to as a Trojan horse or Trojan virus), a worm, malicious code, or by similar terms. Attack agent 110 may comprise an application, service, server, daemon, or other executable logic for encrypting user data files 120 and/or system data files 122. In many implementations, attack agent 110 may communicate with a command and control computer 20, such as to retrieve a public key 112, or to transmit a symmetric key 116.

Specifically, an attack agent 110 may be configured to generate or otherwise obtain a set of cryptographic keys, such as a symmetric key 116. In many implementations, symmetric keys may be utilized for speed of encryption, as symmetric key encryption is significantly faster than public key encryption. Additionally, symmetric key encryption is not prone to message expansion (e.g. a message encrypted via symmetric key encryption may be the same size as the original unencrypted message, while the same message encrypted via public key encryption may be many times the original size of the unencrypted message). In other implementations, the attack agent 110 may be configured to generate a public 112 and private 114 key pair. In still other implementations, the attack agent 110 may be configured to generate both a public 112 and private 114 key pair and a symmetric encryption key.

The attack agent 110 may read one or more files on the victim computer 10, such as user data files 120 and/or system data files 122, and encrypt them (e.g. via the symmetric key 116). The resulting encrypted cipher text may be stored locally (e.g. in storage 106), and the attack agent 110 may delete the clear text or original unencrypted versions of the files. During encryption, the encryption key (e.g. symmetric key 116) may be stored locally, such as in storage 106. In some implementations, the encryption key may not be stored in non-volatile storage 106, but may be instead held in virtual memory, memory 108 (e.g. RAM), or even in a buffer 118 of a network interface 104.

The symmetric key 116 may be transmitted to a command and control server 20 for storage and eventual retrieval upon the occurrence of a subsequent event (for example, once a victim provides a ransom payment), or upon the passage of time. In some implementations, the symmetric key 116 may be stored locally and may be encrypted itself, via a public encryption key 112, either as part of a public/private key pair generated locally by the attack agent 110, or retrieved from C&C server 20 as illustrated. Once transmitted to the C&C server 20, the encryption key 116 and/or public key 112 may be deleted from the victim computer 10.

Figure 2:
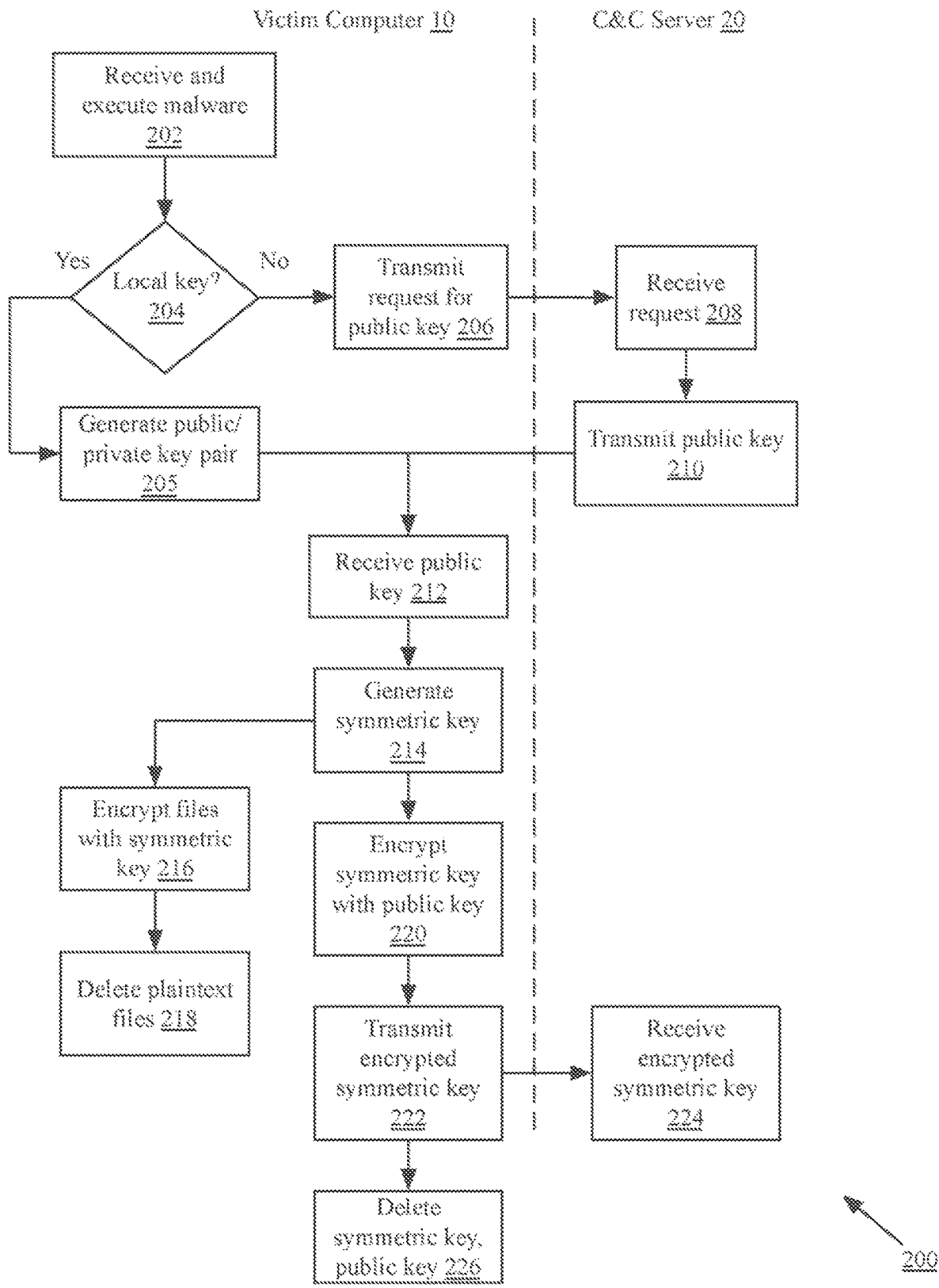
FIG. 2 is a flow chart of an implementation of a malicious encryption attack.

FIG. 2 is a flow chart of an implementation of a malicious encryption attack 200. Many variations of these attacks exist, and the illustrated implementation is provided merely for discussion purposes. In other implementations, one or more of the features shown may or may not be included, and other features or steps may be added.

At step 202, a victim computer 10 may receive and/or execute an attack agent or similar malware. The malware may be received via any means, such as downloaded via the Internet, provided in an infected file or application (e.g. a Trojan), received via a local network from another infected machine, etc.

As discussed above, in some implementations, attack agent 110 may request generation of a public key from a command and control server 20. If attack agent 110 does not generate a local key at step 204, then at step 206, it may transmit the request for the public key of the C&C server. The C&C server may receive the request at step 208 and reply with its public key at step 210. In other implementations in which attack agent 110 does generate a local key, at step 205, it may generate a private and public key pair. The key pair may be generated via any suitable means, such as via a random number generator or pseudo-random number generator and key generation algorithm.

At step 212, attack agent 110 may receive the public key, either locally generated or from the C&C server. At step 214, attack agent 110 may generate a symmetric key from the received public key. The symmetric key may be generated via any suitable means, such as a pseudo-random number generator, true random number generator, retrieval of a random number or seed, or other such sources of entropy.

Multiple sources of entropy may be used in some implementations, with random outputs concatenated, XOR-ed, or otherwise combined.

At step 216, attack agent 110 may encrypt one or more files on or associated with victim computer 10, utilizing the symmetric key generated at step 214. The encryption algorithm may be any suitable symmetric key encryption algorithm, such as the AES block cipher. As described above the encrypted files may include one or more user data files 120, system data files 122, and/or any other combination of these or other files. At step 218, the original plaintext or clear text files may be deleted. In some implementations, a ransom note may be left (e.g. as a "read me" file or similar unencrypted file), or may be displayed by attack agent 110 (e.g. as a pop-up notification or similar display on screen). The note may include instructions on payment and how to retrieve a decryption key.

Simultaneously with encryption, or after encryption and/or deletion have completed, at step 220 attack agent 110 may encrypt the symmetric key with the public key (either locally generated or retrieved). The encrypted key may be transmitted to C&C server 20 at step 222, and received at step 224 for storage. In some implementations, C&C server 20 may decrypt the symmetric key (e.g. via its local private key), while in other implementations, C&C server 20 may simply store the encrypted symmetric key. At step 226, attack agent 110 may delete the symmetric key and public key from local memory and/or storage.

Accordingly, after the attack, the victim computer 10 may include only the encrypted files, ransom note, and, in implementations in which attack agent 110 generates the public/private key pair, the private key. Once a ransom has been paid or upon the occurrence of some other event or the passage of time, attack agent 110 may either retrieve the decrypted symmetric key from C&C server 20 (in implementations in which the public/private key pair are not locally generated), or may retrieve the encrypted symmetric key from the C&C server 20 and decrypt the symmetric key using the locally stored private key. Attack agent 110 may then decrypt the encrypted files with the symmetric key.

The systems and methods of the disclosure will now be described with reference to FIGS. 1 B, and 3-5. As opposed to the systems and methods to address malicious encryption as previously discussed, those of the disclosure may monitor data writes to disk, memory 108, or network transmission buffers 118 for strings that may represent encryption keys or moduli, by applying one or more techniques to decode and parse the string to either identify or extract the keys, or rule out the string as containing an encryption key or modulus (e.g. at steps 205, 212, or 214 of the implementation shown in FIG. 2, rather than steps 202, or 216 or 218, as in other implementations of encryption mitigation discussed above).

Figure 1B:
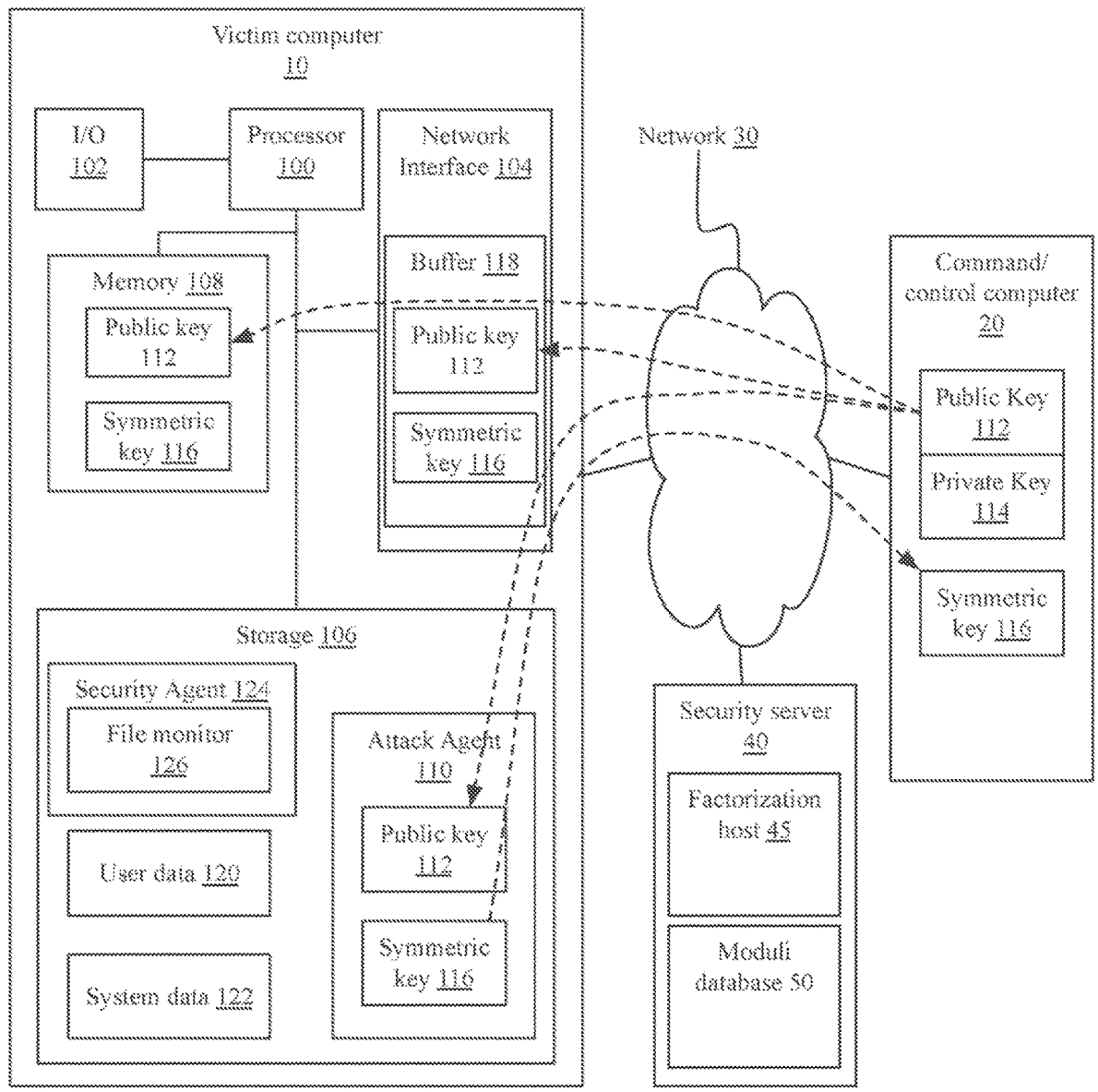
FIG. 1B is a block diagram of an embodiment of an improved system, providing detection and mitigation of malicious encryption.

FIG. 1B is a block diagram of an embodiment of an improved system, providing detection and mitigation of malicious encryption. In some implementations, a victim computer 10 may execute a security agent 124. Security agent 124 may comprise an application, service, server, daemon, routine, or other executable logic for detecting and mitigating malicious encryption attacks. Security agent 124 may include functionality for testing compression ratios of data, testing whether numbers are prime or composite, performing test factorization of numbers, or other such features, discussed in more detail below. In some implementations, security agent 124 may include a file monitor 126 or write interceptor or hook to monitor data writes to memory or storage. Security agent 124 may identify data being written to any location, including a storage device 106, memory units 108 (as well as virtual memory within storage 106 that is treated as a memory unit 108), and, in some implementations, buffers 118 of a network stack. This latter feature may be useful for identifying encryption keys transmitted to or received from C&C server 20.

In some implementations, as security agent 124 utilizes functionality for monitoring file reads and writes, security agent 124 may be integrated within other software such as backup software or file sharing and synchronization software in (or executed by) victim computer 10. For example, in some implementations, backup software or synchronization software may monitor a file system for new or modified files. Upon detection, in addition to performing various backup or synchronization routines, security agent 124 may attempt to detect whether the new or modified file includes a key or modulus. Security agent 124 may perform compression routines, discussed below in more detail in connection with FIGS. 3A and 3C. In some implementations in which security agent 124 is integrated with or communicates with backup or synchronization software, the backup or synchronization software may perform compression of detected new or modified data, e.g. to reduce storage or network bandwidth requirements. Thus, in some such implementations, security agent 124 may receive the results of this compression for analysis at steps 318-320 discussed below in connection with FIGS. 3A and 3C; and may, in some implementations, skip steps 316, 360, and/or 362, also discussed below.

Security agent 124 may be configured to detect when a key pair, such as an RSA key pair, is generated or received. This may be done via the unique structure and arithmetic properties of key pairs. Although primarily discussed in terms of RSA encryption, these systems and methods apply to any encryption system with consistent formats for keys or keys for which a key validation routine may be applied (e.g. a function that determines whether a numeric string is a valid key).

In RSA cryptography, for example, a cypher text c may be generated via the function $m^e (\mod n)$, where m is the original message (in this case, a given user data file 120 or system data file 122), e is the public exponent and n is the public modulus. Together, the exponent and modulus form the public key. Anyone with these values may thereby encrypt their message resulting in cipher text c. Only the holder of the private exponent d may perform the reverse calculation ($c^d = (m^e)^d = m \pmod{n}$) to recover the original message m. Keeping the private exponent d secret while satisfying the equations requires that n=pq for large primes p and q. These values must also be kept secret since anyone who knew them could easily calculate the private exponent d. This process of RSA key generation is quite time-consuming and is therefore infrequently performed, a fact which may be exploited by the security agent.

Figure 3A:
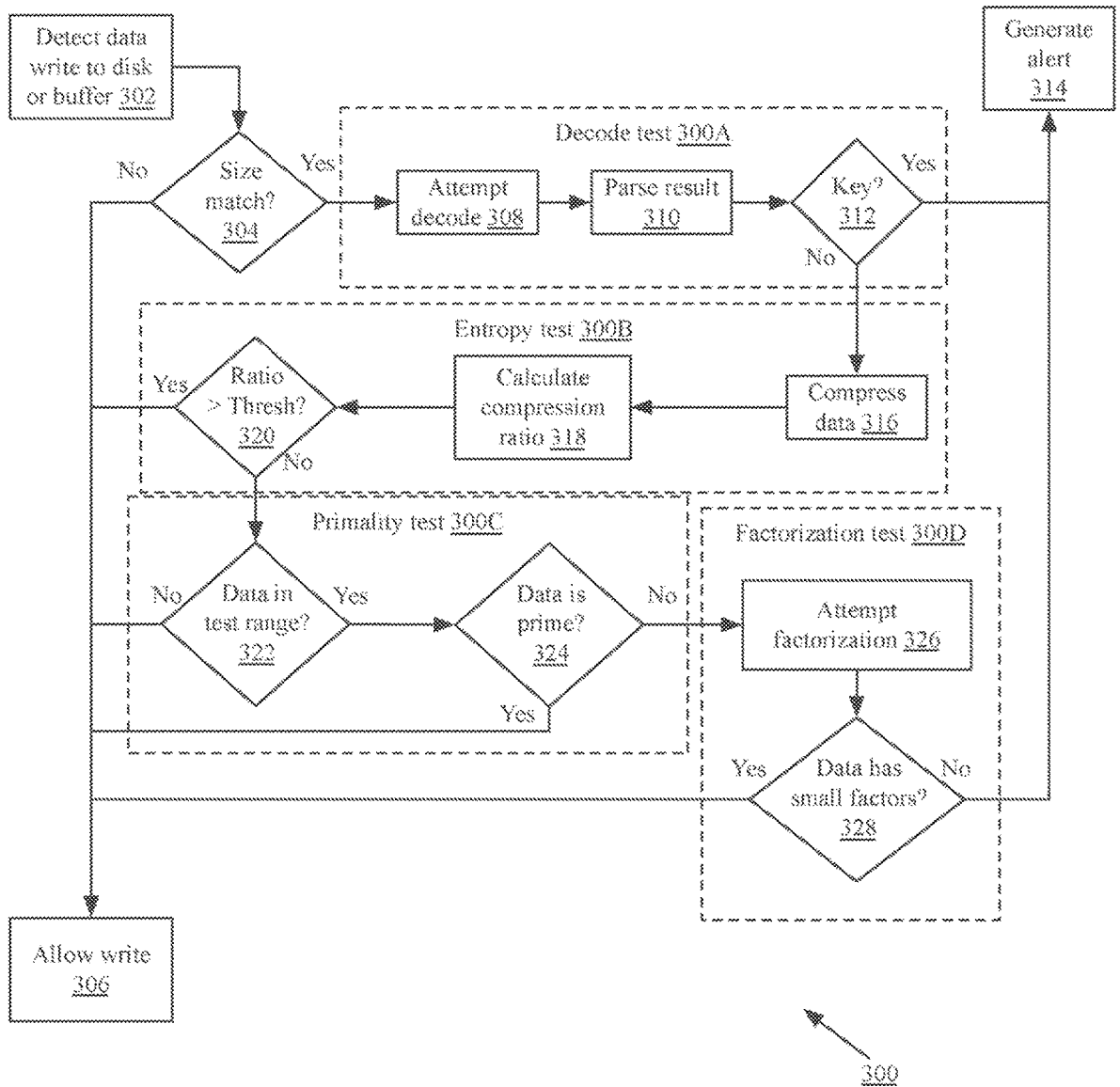
FIGS. 3A-3E are flow charts of implementations of methods for detection of malicious encryption.

FIG. 3A is a flow chart of an implementation of a method for detection of malicious encryption through detection of key generation or receipt. In the description to follow (as well as in the description of other flow charts or methods below), reference is made to one or more "steps." Each of the described steps may be carried out by use of a corresponding "module" of computer programming instructions executed by the system as described with reference to FIG. 1B or 5. These modules of computer code may be standalone modules (for example, coded as a library function that is statically or dynamically linked to the source tree of an overarching program), or may be integrated into the source tree of an overarching program, or may be embodied as a mix of these two methodologies (for example, subfunctions of one or more of the steps set forth below may be embodied as separate library functions). Although shown in a given order, in many implementations, one or more steps may be executed in a different order than shown, and/or may be executed in parallel. In some implementations, one or more steps may be executed by different devices operating in conjunction; for example, various steps may be distributed amongst several devices in communication with each other or with a controlling or master device.

At step 302, security agent 124 may monitor data written to storage 106 or memory 108 and/or received in buffer 118 of a network stack to find strings that look like keys such as RSA keys. Recall that ransomware must store and communicate RSA keys in order to send the right components to the attacker. In modern usage, advances in computing power mean the RSA modulus n is generally 2048 or 4096 bits in length, however, other lengths may be utilized. Furthermore, even if an RSA modulus n is padded by additional data (e.g. header information, ransom instructions, etc.), portions of the data of predetermined lengths may be analyzed separately or in combination (e.g. via a sliding window or similar algorithm).

Security agent 124 may be configured to provide an alert to a user or take other mitigation steps in response to an output from file monitor 126 monitoring the file system and memory for new data of exactly these lengths or in similar sizes to these lengths. As this approach may lead to a number of false positives, security agent 124 utilizes one or more techniques to validate that a string represents a plausible key modulus, with techniques applied in order of processing or memory requirements.

At step 304, file monitor 126 or security agent 124 may determine if the detected data matches a predetermined size range or threshold. In this case, file monitor 126 or security agent 124 may detect if the incoming write data is 2048 or 4096 bits in length, or any other such predetermined length in some implementations (e.g. 1024 bits, 8192 bits, etc.). For example, few files or data items on a modern computer are exactly 2048 or 4096 bits in length, so security agent 124 may identify these files or strings as suspect. If the string is one of these exact lengths, security agent 124 will issue an alert notification at step 314. If the length of the string is not one of these exact lengths, security agent 124 continues further processing at step 300B.

Alternatively, cryptographic public keys are often encoded in a format called Privacy Enhancing Mail (PEM). This format is described in RFC 1422, entitled "Privacy Enhancement for Internet Electronic Mail: Part II: Certificate-Based Key Management," published February 1993 by the Internet Engineering Task Force (IETF), which is incorporated herein by reference. In essence, the key is encoded in a format called Abstract Syntax Notation One (ASN.1) which is then encoded using the Base-64 representation commonly used to transfer binary data using only printable ASCII. These encoding layers slightly enlarge the file to between 800 and 2000 bytes. Thus, in some implementations, file monitor 126 or security agent 124 may determine if the detected file or data to be written is between 800 and 2000 bytes in length (though other values may be used in other systems, based on common padding or encoding of keys). Thus, in some implementations, file monitor 126 may cause security agent 124 to conduct decode test 300A only if incoming data to be written is within a specified range in length, such as 800 to 2000 bytes in length. In similar implementations, file monitor 126 may utilize other file length or byte ranges as may indicate key encryption, in accordance with other encryption methodologies.

If the data is within one or both of the sizes/ranges set forth above, in a first technique 300A, security agent 124 may attempt to decode the data as if it were a key. For example, security agent 124 may include a decode module 308 that includes the openssl program and/or similar decryption programs to perform decoding of base-64 and ASN.1 encoding on incoming or detected data strings. In one implementation, such programs or tools may be applied to the data string as follows, with infile being a new file written to disk or data string written to memory 106 or a buffer 118:

---
If 800 <sizeof(infile) < 2000 bytes:
 openssl rsa -in infile -out pubout
 End.
---

If decode module 308 successfully decodes Base-64 and ASN.1 encoding layers of the incoming or detected string, it may generate the following result:

---
- - - - -BEGIN RSA PUBLIC KEY- - - - -
MIIBIjANBgkqhkiG9w0BAQEFAAOCAQ8AMIIBCgKCAQEAvdeddaqcqOvBNzxPWjgJ
f6MzWsfPnpTxW6T79LtFxYIb71yljxnvZ9z1AM09TPNgyay3rk3oIkBrOMdwpHme
yc9qH5QffPLKwHSVodcoAPwC87A5KC86XnrLzvITEqNaV5jn0VxiPJcMWAjVbeut
mYF/Uf+xiYU5daHCmnkF3FX+n04HV4jtvHcNhi5p/UrMkgBhcWFIMkZqjHrRGV/M
B5BOAUeySa7NlobfrmSrw0ASIuX2w3g8hpbJoY1dKd6rjr7Y6+fUyWEFMTMjwl1z
8xf0vW+LTuylW5PNFgvzXyjR78lOX/hOsGj93I5v1NXttHBjPc1EP3BYHkj/I4qP
wQIDAQAB
- - - - -END RSA PUBLIC KEY- - - - -
---

At step 310, security agent 124 may parse the output generated by decode module 308. If the output includes predetermined strings (such as the "begin RSA public key" or "end RSA public key" strings or similar predetermined strings) or otherwise matches a key format at step 312, then at step 314, security agent 124 may generate or trigger an alert.

Figure 3B:
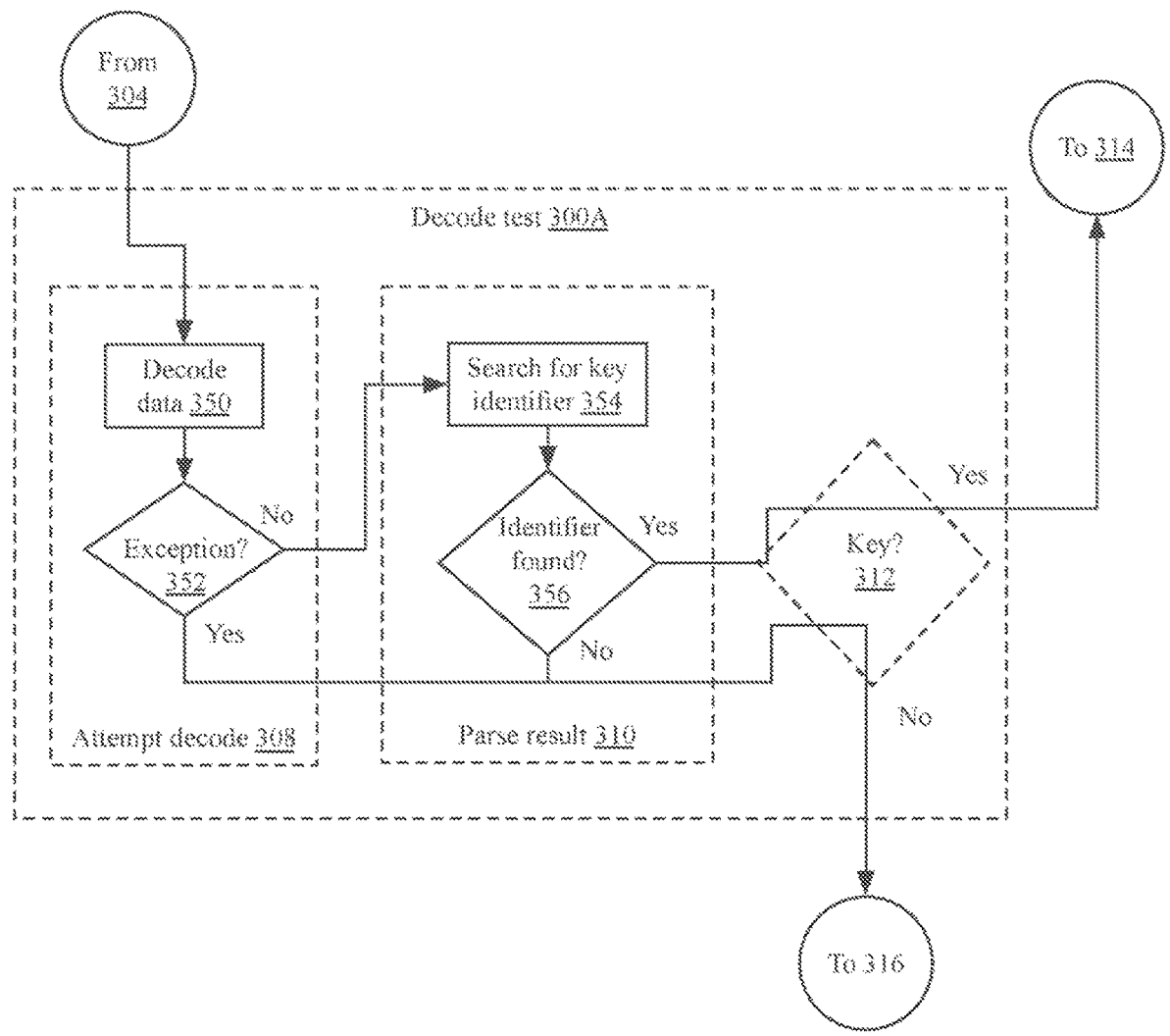

Of course, the use here of openssl is merely an illustrative example. Libraries exist for most modern programming languages. Referring briefly to FIG. 3B, additional details of an implementation of decode test 300A are illustrated. In one implementation, security agent 124 may decode the data string at step 350. The decoding, such as decoding from base-64 and ASN.1 encoding, may be performed by security agent 124 or by a third party application or routine called or executed by security agent 124. In some implementations, the decoder may not perform verification on the output, and/or may not provide an exception or error code at step 352. If it does not, then in some implementations, at step 354, the output data may be parsed for a key identifier or compared to a key format. If the identifier is found at step 356, then the string likely represents a key and an alert may be generated at step 314. If not, then the method may proceed with step 316 (described below). In some implementations, the decoder step 350 may generate alerts or exceptions for non-matching strings. For example, the decoder step 350 may include execution of C# RSACryptoServiceProvider, to verify the presence of a key as follows:

```
AsymmetricCipherKeyPair keyPair;
using (var r = File.OpenText (@"infile"))
    keyPair = (AsymmetricCipherKeyPair) new
PemReader(r).ReadObject( );
```

If this code generates an exception, then the string may not be a key and the method may proceed with step 306. Otherwise, the string may be a key and the incoming write data or detected data may be parsed at step 310, and an alert may be generated at step 314.

Of course, not all ransomware variants perform this type of encoding. Therefore, if openssl or RSACryptoServiceProvider or similar tools cannot decode the data string, then the method 300 may proceed to apply additional key detection tests. Returning to FIG. 3A and continuing, an entropy test 300B may be used to examine the entropy or information content of the data string. Most files created by users follow one of several well-known probability distributions: English text for instance is known to have only an information content of roughly 1.3 bits per byte. This is why simple compression algorithms like Lempel-Ziv and deflate are able to function. Cryptographic key values by contrast have an extremely high information content (e.g. 7 bits per byte): the application of a comp.ression algorithm should not appreciably reduce the size of the file or string containing the modulus. The entropy test 300B may be used to reduce false positives even further.

For example, using the gzip tool, the string may be compressed at step 316 using a lossless compression tool, such as Lempel-Ziv (LZ) compression:

```
If 250 < sizeof(infile) < 800 bytes:
    gzip -c infile > infile.gz
End.
```

Then, the sizes of the uncompressed file and the compressed file may be compared at step 318, for example by using standard C# libraries or other such system tools:

```
long length = new System.IO.FileInfo(infile).Length;
long gzlength = new System.IO.FileInfo(infile.gz).Length;
long ratio = length / gzlength;
if (ratio > 1.1)
    do-not-alert
End.
```

If the ratio exceeds a predetermined threshold at step 320 (per this example, 1.1), then the string is likely not a key and security agent 124 may allow the write to proceed at step 306 (and not trigger an alert at step 314).

Figure 3C:
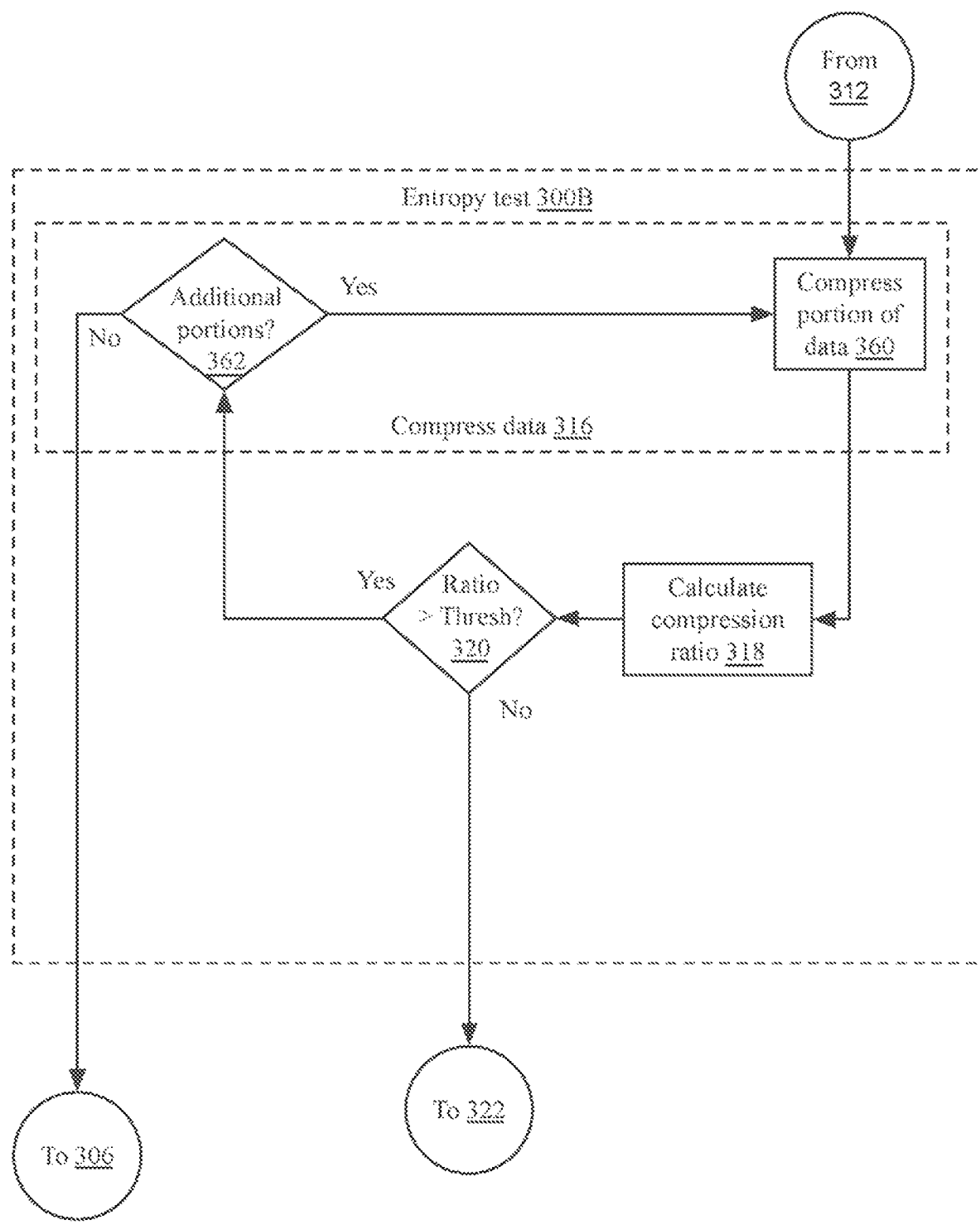

Referring to FIG. 3C, an illustration of an implementation of an entropy test 300B is provided in more detail. As discussed above, in some implementations, a key may be padded so as to disguise the key, or additional data may be included with the key (e.g. ransom instructions or other information). Accordingly, different portions of the data may have different compression ratios. Some compression tools may report different compression ratios for different portions of the file, or, in the implementation illustrated, compression may be applied to various portions of the file to test compression ratios. For example, LZ compression uses a dictionary-based compression model in which a dictionary or table is constructed from strings of data in the file, and subsequent repeated strings are replaced with table entries or identifiers. The more such strings are repeated, the greater the file may be compressed. The generated table and identifiers may be Huffman encoded or similarly entropy encoded, with shorter indices or fewer bits used for identifiers of the most common repeated strings. The length of the replaced string and the length of the index or position within the Huffman tree may be used to determine which parts of the file will compress well and which parts will not. For example, in one implementation, the length of a replaced string may be divided by the length of its Huffman index, such that frequently repeated (e.g. lower indices) long strings have a higher ratio than short strings or moderate length strings that are less frequently repeated (e.g. longer indices). These ratios may be aggregated in one implementation to calculate compressibility of the segment.

In another implementation, portions of the file may be of predetermined size, such as 100 or 1000 bytes, and security agent 124 may attempt to compress each portion in sequence. In a further implementation, these portions may be compressed via a sliding window algorithm (e.g. first attempting to compress bytes 0-1000, then bytes 200-1200, etc.).

In still another implementation, routines executed by security agent 124 or an operating system may include an abort sequence or result if compressibility is below a predetermined threshold. For example, in some implementations, a compression routine may attempt to compress some or all of the data. If, during compression, the routine determines that the compression ratio is poor (e.g. detected repeated strings for an LW dictionary are below a predetermined threshold length or frequency, or a post- to pre-compression size comparison of the portion is higher than a predetermined threshold ratio), then the routine may abort, generate an error, and/or insert an indicator in the output data (e.g. a flag in a header indicating that compression failed or was aborted).

At step 360, a first portion of the data may be compressed. At step 318, a compression ratio of the average number of bits post-compression per byte of data prior to compression (expressed as "compressed bits/original byte") may be calculated. If the ratio is greater than a predetermined threshold (e.g. 25%, 50%, 10%, etc.), then security agent 124 may determine if additional portions of the data need to be compared. If additional portions of the data need comparison, then steps 360-320 may be repeated iteratively. If the first data portion, and any successive compressed data portions, all have a compressed bits/original byte ratio above below the given ratio, then the method may proceed with step 306 to permit the write operation.

As discussed above, if a compression ratio for a portion of the data is not greater than the threshold, then the portion of the data may have high entropy, indicating it is likely not, for example, English text, but may instead be an encryption key (English text having a theoretical compression ratio of up to 83%, although in practice, compression algorithms do not achieve such efficiency because of the required computation times). Thus, if the compression ratio is not greater than the threshold—i.e. if the portion of the data is not significantly compressible—then the portion of the file may be an encryption key, and the method may proceed at step 322 for additional confirmation of key generation if required or desired.

Entropy test 300B check is a heuristic approximation to the Shannon entropy, and histogram estimator of differential entropy of a probability distribution expressed as $$H(X) = -\sum_{i=0}^{N-1} p_i \log_2 p_i$$

where $p_i$ is the probability of character number i appearing in the stream of characters N of the message. It will be readily apparent to one skilled in the art that other methods of entropy estimation are possible, such as explicit computation of the empirical Shannon entropy (as opposed to the estimation technique described above).

If the foregoing tests have not concluded that the data string is not a key or is a false positive or "do not alert" value, then security agent 124 may proceed to more computationally intensive checks.

Specifically, returning to FIG. 3A, if the entropy test 300B does not rule out the string being a key, then a primality test 300C may be applied to determine whether the data is an RSA modulus. Simple tests exist to determine if a given number is prime, even though these tests do not actually determine the prime factorization. For example, the Miller Rabin test or Fermat's Little Theorem can prove that a number is composite. Recall that the RSA modulus is a composite n=pq. If security agent 124 finds a file containing a large composite integer, it may trigger an alert; and conversely, if the string is prime, then it is definitely not a modulus.

The data string may be converted to a numeric representation n, as a large integer, and compared to a test range at step 322:

---
If n < 2^1023 or n > 2^4097
do-not-alert
End.
---

If the value is not within this range, then the data string would represent a modulus too small to resist factorization or may be needlessly large; that is, the tested data string is not an RSA modulus and processing may proceed at step 306. If n is contained in this range, the tested data string may then be tested by security agent 124 to determine if n is prime at step 324 (if additional computational analysis is desired) or may generate an alert at step 314 (if additional computational steps are not necessary or desired). If n is prime, the tested data string is not an RSA modulus and processing may proceed at step 306 to permit the write operation.

Figure 3D:
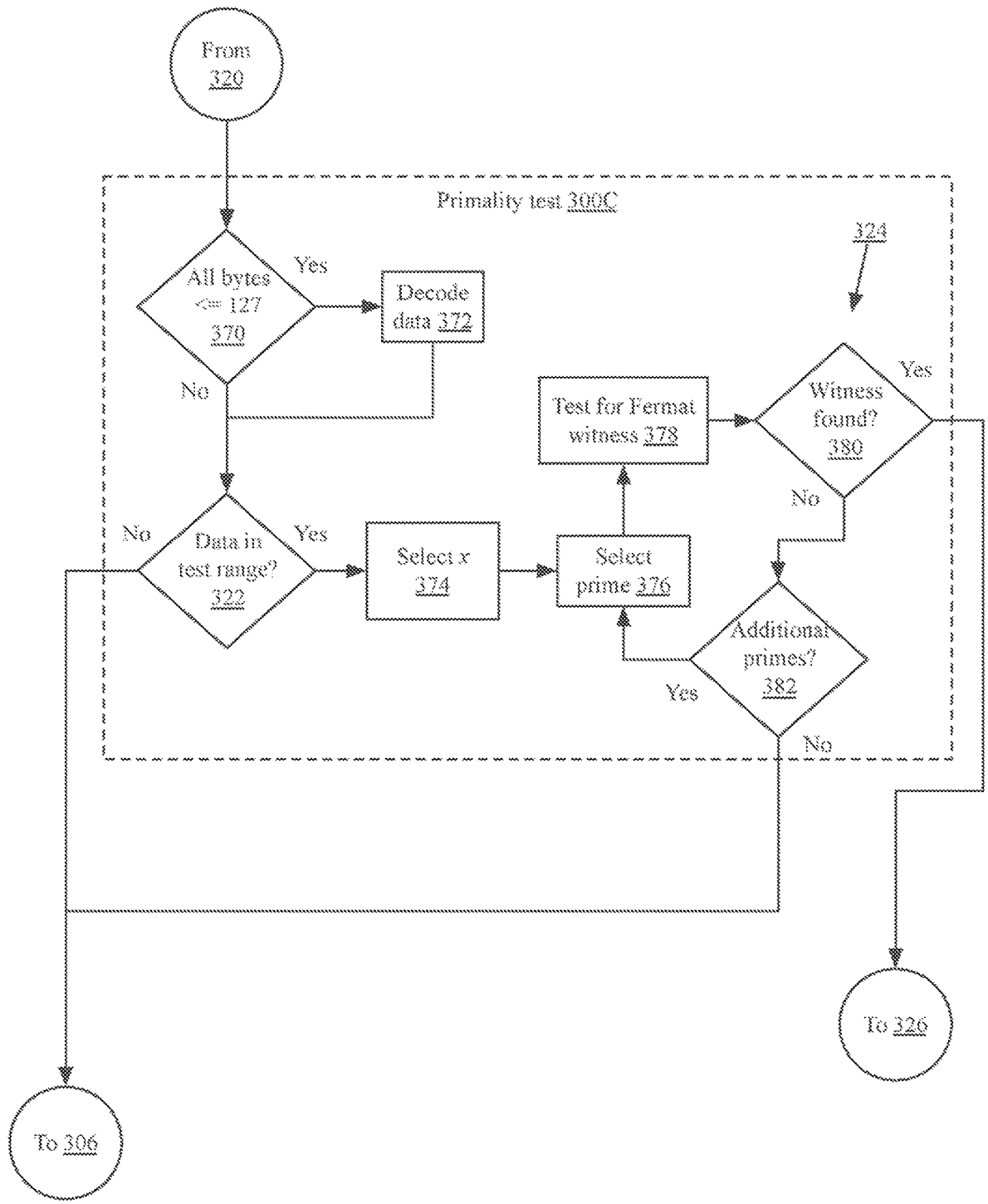

FIG. 3D illustrates an implementation of a primality test 300C in more detail. Consider the character set used in inf ile as discussed above. To convert the data to a numeric representation, in some implementations, base-64 decoding may be required. Security agent 124 may determine at step 370, on a bytewise basis. If the data in each tested byte is less than or equal to 127, then the data may be ASCII characters, which each have values less than 127. Conversely if the data is random or an encoding of a large integer, then it may have bytes greater than 127. If each byte is less than or equal to 127, then at step 372, security agent 124 may apply Base-64 decoding to the input data as described above. The resulting decoded representation may be used as the value n, as a potential RSA modulus.

From Fermat's Little Theorem, recall if $a^{n-1} \neq (\mod n)$, with $1 < a < (n-1)$ then n is not prime (otherwise, it might be prime). Therefore, the Fermat primality test proceeds by choosing prime values $a_i < n$ and iteratively testing. At step 374, security agent 124 may select a starting value $a_i$, which may be random or may be a predefined value (e.g. 2) and may be in the range $1 < a_i < n$. At step 376, security agent 124 may select a starting prime (e.g. 2). At step 378, security agent 124 may test for a Fermat witness, for example, calculating $x = x \hat{} a_i * (\mod n)$.

If the result does not equal "1", then at step 380, security agent 124 determines that the key n is composite and the method may proceed to step 326 for optional additional key detection processes, or (if such additional processes are not utilized) may proceed to generating an alert at step 314. If the result of the foregoing calculation is "1", security agent 124 determines that the key n may be prime, and the method may repeat steps 376-380 for additional prime numbers selected at random or in increasing order at step 376. For example, in one implementation, steps 376-382 may be repeated iteratively for each of a set of prime numbers, such as the first 128 prime numbers (e.g. a sequence of successive primes 3, 5, 7, 11, 13, etc.). In other implementations, other numbers of iterations may be used. Each iteration reduces the likelihood of a false positive—the possibility of a false positive is roughly 1 in $2^n$, given n number of iterations. Given a potential 128-bit AES key, then n=128 may be reasonable. For longer keys or in other implementations, a lesser or greater number of iterations may be performed. Thus, in one embodiment, security agent 124 may perform the following:

---
Let a = 2
Repeat 128 times:
  x = x^a (mod n)
  if (x • 1) exit;
  if (x = 1) let a = next prime
do-not-alert
End.
---

If the security agent exits this routine without detecting a composite number, then n is likely prime and the process proceeds to step 306 to permit the write operation. If steps 374-380 result in identifying a composite number, then the process proceeds to step 326 (if additional computational analysis is desired) or may generate an alert at step 314 (if additional computational steps are not necessary or desired).

Returning to FIG. 3A, having determined that n is composite, security agent 124 may attempt to determine at least a partial prime factorization. In the parlance of number theory, most integers are "smooth" or composed as the product of many small primes and prime powers. For example, simply choosing a 2048-bit integer at random, the result will almost certainly be divisible by many small primes and not be of the special form used in RSA n=pq.

While factorization in general is believed to be a hard problem, this is only true in the worst case n=pq with p and q of comparable size. A false positive—that is, a number encountered at random encountered by security agent 124—would almost certainly have many smaller factors. Fortunately, there are several integer-factorization algorithms that are especially suited to this case when n contains small factors. Thus, at step 326, security agent 124 may attempt to perform a partial factorization of the composite value n utilizing one or more of such integer-factorization algorithms. At step 328, security agent 124 may determine if the composite number has small factors or factors smaller than a predetermined threshold (e.g. less than $2^8$ or 256 in one implementation, or any other such threshold). If so, then the number is likely not a modulus, and the method may proceed at step 306 to permit the write operation. This may reduce the number of false positives generated by security agent 124.

Figure 3E:
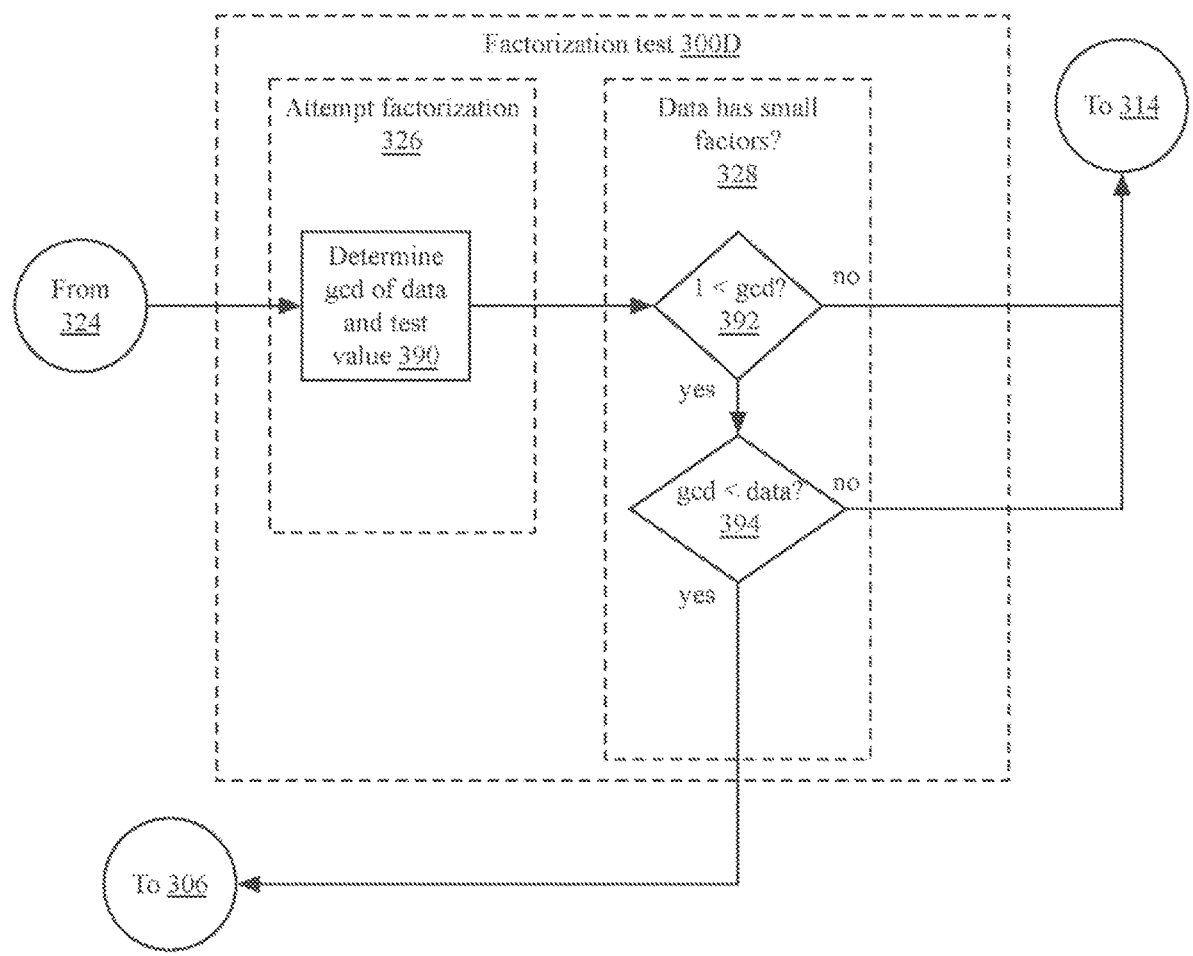

FIG. 3E is a flow chart for one implementation of a factorization test 300D. Other factorizations may be applied without departing from the scope of these methods and systems. Pollard's "(p-1)" method is similarly based on Fermat's Little Theorem as discussed above, but stated slightly differently. First, in the parlance of number theory, suppose n has a prime factor p. Then, $a^{k(p-1)}=1 \pmod p$, with $1a<(p-1)$. Given any value $x=1 \pmod p$: $\gcd((x-1), n) \neq 1$. However, we do not know the value of p, just that it exists. Accordingly, at step 390, security agent 124 may determine the greatest common denominator (gcd) between the numeric representation of the data n and a test value of $2^{m-1}$ (mod n), with m being the product of the primes up to a predetermined threshold (e.g. up to $2^{32}$ in some implementations). Security agent 124 may determine whether the data has small factors (step 328) by determining if the greatest common denominator is greater than 1 (at step 392), and if it is less than the data value n (at step 394). If both are true, then the data has a "small" prime factor within the predetermined range of primes up to the threshold, and is likely not a modulus. Accordingly, the method may proceed at step 306 to permit the write operation. If the data is a composite number that does not have small prime factors, then it may be an RSA modulus, and at step 314, security agent 124 may generate an alert. Accordingly, security agent 124 may perform the following:

Let m = • (primes less than $2^{32}$)
g = gcd(n, $2^m$ - 1 (mod n))
if 1 < g < n do-not-alert
End.

It will be readily apparent to one skilled in the art that there are many different factoring algorithms and though the (p-1) method is illustrated here, other such algorithms may be used. These various factoring algorithms all have running time or time of execution proportional to the smallest prime in the decomposition. Since most numbers chosen at random are smooth, these factorization methods should quickly produce at least one factor and thereby eliminate a false positive for security agent 124. If these methods "succeed," the security agent permits the write operation at step 306, and does not send an alert at step 314.

In some implementations, one or more of tests 300A-300D may be skipped to reduce delay or processing load on the computing device. In one implementation, a whitelist of applications and/or servers or remote computing devices may be utilized with data generated by said applications or received from said servers or remote computing devices may bypass one or more of tests 300A-300D, as the risk may be reduced to the point where (for example) if security agent 124 runs tests 300A and 300B and no key is detected, that may be sufficient. In some implementations, one or more of tests 300A-300D may be performed remotely, e.g. on a cloud server or other distributed computing resource. This may reduce processor requirements on victim computer 10, which may be particularly useful for mobile devices and/or Internet-of-Things appliances or devices with limited processing capability.

Figure 4:
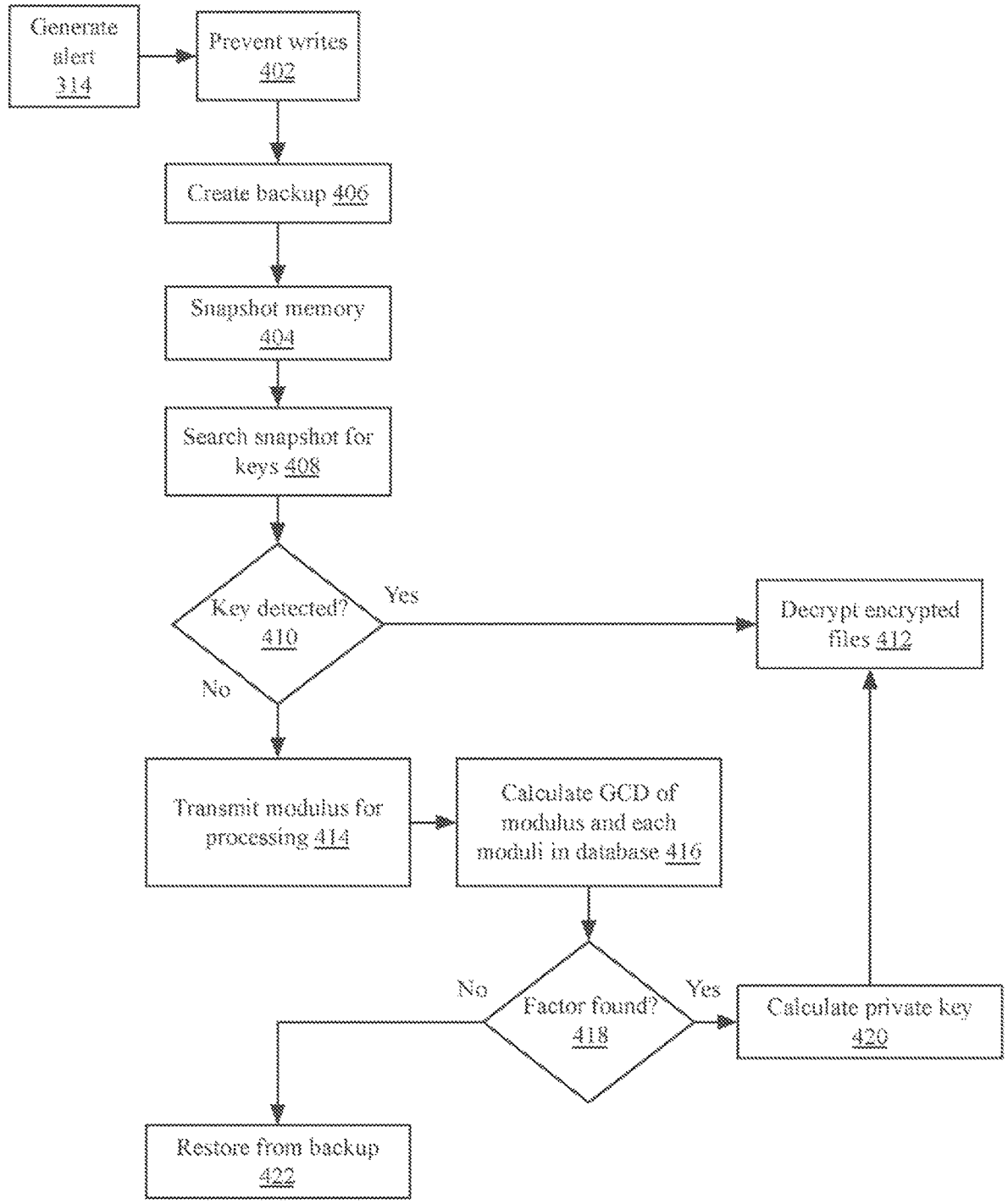
FIG. 4 is a flow chart of an implementation of a method for mitigation of malicious encryption.

Once an alert is triggered at step 314, security agent 124 may take one or more actions to contain or mitigate the presumed attack. FIG. 4 is a flow chart of an implementation of one method for mitigation of malicious encryption as conducted by security agent 124. As discussed above, security agent 124 may perform the method if none of the previously discussed factorization methods have succeeded in identifying a prime number in the incoming data to be written, and the primality tests show that the number is composite. As previously mentioned, such data is very likely to be an artifact of a key generation, suggesting that a ransomware attack is underway.

At step 402, security agent 124 may prevent or throttle subsequent attempts to delete data such as the user's files on disk, and/or may prevent further write commands to the disk or memory of the computing device. For example, security agent 124 may prevent encryption threads from finishing, may prevent deletion from proceeding, or may throttle these threads to a minimum processing speed while notifying the user. In some implementations, security agent 124 may generate an alert message or notification for the user, and/or may send a notification message over a network to a system administrator. In some implementations, at step 406, security agent 124 may begin replicating data to a read-only location either on local disk or over a network. Once written, this data may be locked against further writes until allowed by an administrator or the user, preventing further attack and encryption of data.

In addition, at step 404, security agent 124 may store a snapshot of the contents of a memory unit (e.g. RAM), as well as any in-use and disused areas of virtual memory and/or buffers 118. This step has important benefits: RAM and virtual memory contents may enable a future forensic investigation. If the ransomware generated the RSA key pair locally, it is possible that the corresponding private key is still found either in RAM or virtual memory. If found, the private key would enable the subsequent decryption of any encrypted files.

At step 408, security agent 124 may apply all the foregoing techniques discussed above with reference to FIGS. 3A-3E to find keys in memory, disused areas of virtual memory, and deleted files on disk. Security agent 124 may determine if a key is detected at step 410, and if so, at step 412, may decrypt any encrypted files.

If a key is not found, then in some implementations, a crowd-sourced approach may be utilized to identify the key, via factoring by collision. As discussed above, the Pollard (p-1) factoring method described with reference to FIG. 3E utilizes computation of greatest common denominators. A nontrivial gcd p of two integers n and m represents a factor of both of them. The factoring method discussed above in connection with FIG. 3E blindly computes a large number hoping for a collision.

Thus, at step 414, having detected an RSA modulus, security agent 124 may transmit the modulus n to a security server, which may similarly receive and store detected RSA moduli from a plurality of infected victim computing devices. Referring briefly back to FIG. 1 B, a security server 40 may comprise any type and form of computing device, including a physical server, a cluster of servers, a virtual server executed by one or more physical servers, a server farm or cloud, or any other similar devices. Security server 40 may include one or more of a processor 100, I/O interface 102, network interface 104, storage 106, and memory 108.

In some implementations, security server 40 may execute a factorization host 45. Factorization host 45 may comprise an application, server, service, daemon, routine, or other executable logic for receiving moduli from security agents 124 of victim computers 10, storing the moduli in a database 50 in a storage device (not illustrated), and for calculating factorization to identify collisions. Specifically, and returning to FIG. 4, at step 416, responsive to the receipt of a new modulus, factorization host 45 may compute the pairwise greatest common denominators of all known moduli in moduli database 50:

For each moduli m in the database,

```
Let g = gcd(n, m)
    if 1 < g < min(n,m) factor-found
End.
```

If a factor is found at step 418, then the key may be determined. Specifically, because we expect victim computers to be poor sources of random numbers, it is likely that we will see repeated factors and therefore be able to factor the moduli n and m. Therefore, the factorization host may transmit the value g to security agent 124. At step 420, security agent 124 may directly compute the private key, and at step 412, decrypt any encrypted files. As noted above in the Background Section, if the victim can simply restore from backup 422, then no files are lost; however, if backups are not frequent enough, some data may be lost.

Thus, in some implementations, computing devices may transmit potential moduli to a server executing a factorization host 45. Factorization host 45 may receive a plurality of moduli from a plurality of devices, which may be less than or equal in number to the number of moduli (e.g. some devices may provide multiple moduli). Factorization host 45 may store received moduli in a moduli database 50. For each received moduli, factorization host 45 may determine whether a gcd exists for each other received moduli that is less than either of the moduli values (i.e. $1<g<\min(n, m)$ as shown above). If so, the factorization host 45 may transmit the determined gcd to the security agent or agents 124 that provided the corresponding moduli for use decrypting encrypted data.

Additionally, in some implementations, the factorization host may perform other factorization algorithms that may be too computationally expensive for a user agent or computing device. For example, the factorization host may harness many computers and computational resources like graphics cards, ASICs, FPGAs, etc. in applying factorization algorithms to newly received moduli.

It will be readily apparent to one skilled in the art that the monitoring agents may be similarly applied on the user's local PC, to monitor the network stack of the PC, and also on data coming into our cloud backup service.

Figure 5:
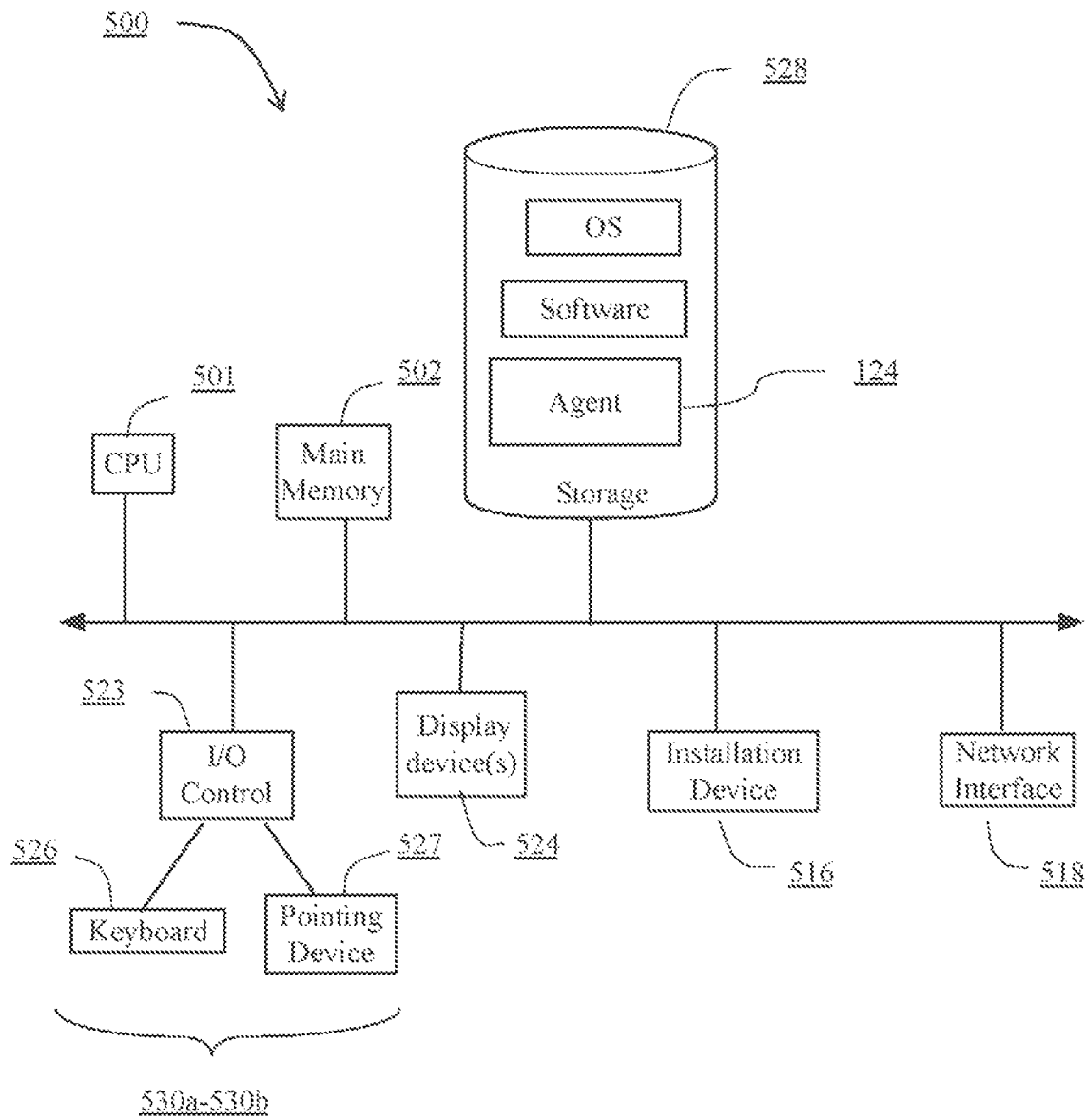
FIG. 5 is a block diagram of an exemplary computing device useful for practicing the methods and systems described herein.

FIG. 5 is a block diagram of an exemplary computing device useful for practicing the methods and systems described herein. The various devices 10, 20, 40 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet sold by Apple Inc. or Android-based tablet such as those sold by Samsung Group, smart phone or PDA such as an iPhone-brand/iOS-based smart phone sold by Apple Inc., Android-based smart phone such as a Samsung Galaxy or HTC Droid smart phone, or any other type and form of computing device capable of operating as described herein. FIG. 5 depicts a block diagram of a computing device 500 useful for practicing an embodiment of the user devices 100 or device of an online storage or backup provider. A computing device 500 may include a central processing unit 501; a main memory unit 502; a visual display device 524; one or more input/output devices 530a -530b (generally referred to using reference numeral 530), such as a keyboard 526, which may be a virtual keyboard or a physical keyboard, and/or a pointing device 527, such as a mouse, touchpad, or capacitive or resistive single- or multi-touch input device; and a cache memory in communication with the central processing unit 501.

The central processing unit 501 is any logic circuitry that responds to and processes instructions fetched from the main memory unit 502 and/or storage 528. The central processing unit may be provided by a microprocessor unit, such as: general purpose microprocessors sold by Intel Corporation of Santa Clara, Calif. or Advanced Micro Devices of Sunnyvale, Calif.; specialty microprocessors sold by Qualcomm Inc. of San Diego, Calif. or Samsung Group of Samsung Town, Seoul, South Korea; or any other single- or multi-core processor, or any other processor capable of executing programmed instructions and otherwise operating as described herein, or a combination of two or more single- or multi-core processors. Main memory unit 502 may be one or more memory chips capable of storing data and allowing any storage location to be directly accessed by the microprocessor 501, such as random access memory (RAM) of any type. In some embodiments, main memory unit 502 may include cache memory or other types of memory.

The computing device 500 may support any suitable installation device 516, such as a floppy disk drive, a CD-ROM drive, a CD-R/RW drive, a DVD-ROM drive, tape drives of various formats, USB/Flash devices, a hard-drive or any other device suitable for installing software and programs such as a security agent 124 or portion thereof. The computing device 500 may further comprise a storage device 528, such as one or more hard disk drives or redundant arrays of independent disks, for storing an operating system and other related software, and for storing application software programs such as any program related to the security agent 124.

Furthermore, the computing device 500 may include a network interface 518 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, Bluetooth), cellular connections, or some combination of any or all of the above. The network interface 518 may comprise a built-in network adapter, network interface card, PCMCIA network card, card bus network adapter, wireless network adapter, USB network adapter, cellular modem or any other device suitable for interfacing the computing device 500 to any type of network capable of communication and performing the operations described herein.

A wide variety of I/O devices 530a -530n may be present in the computing device 500. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 530 may be controlled by an I/O controller 523 as shown in FIG. 5. The I/O controller may control one or more I/O devices such as a keyboard 526 and a pointing device 527, e.g., a mouse, optical pen, or multi-touch screen.

Furthermore, an I/O device may also provide storage 528 and/or an installation medium 516 for the computing device 500. The computing device 500 may provide USB connections to receive handheld USB storage devices such as the USB Flash Drive line of devices manufactured by Twintech Industry, Inc. of Los Alamitos, Calif.

The computing device 500 may comprise or be connected to multiple display devices 524a -524n, which each may be of the same or different type and/or form. As such, any of the I/O devices 530a -530n and/or the I/O controller 523 may comprise any type and/or form of suitable hardware, software embodied on a tangible medium, or combination of hardware and software to support, enable or provide for the connection and use of multiple display devices 524a -524n by the computing device 500. For example, the computing device 500 may include any type and/or form of video adapter, video card, driver, and/or library to interface, communicate, connect or otherwise use the display devices 524a -524n. A video adapter may comprise multiple connectors to interface to multiple display devices 524a -524n. The computing device 500 may include multiple video adapters, with each video adapter connected to one or more of the display devices 524a -524n. Any portion of the operating system of the computing device 500 may be configured for using multiple displays 524a -524n. Additionally, one or more of the display devices 524a -524n may be provided by one or more other computing devices, such as computing devices 500a and 500b connected to the computing device 500, for example, via a network. These embodiments may include any type of software embodied on a tangible medium designed and constructed to use another computer's display device as a second display device 524a for the computing device 500. One ordinarily skilled in the art will recognize and appreciate the various ways and embodiments that a computing device 500 may be configured to have multiple display devices 524a -524n.

A computing device 500 of the sort depicted in FIG. 5 typically operates under the control of an operating system, such as any of the versions of the Microsoft®. Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 500 may have different processors, operating systems, and input devices consistent with the device. For example, in one embodiment, the computer 500 is an Apple iPhone or Motorola Droid smart phone, or an Apple iPad or Samsung Galaxy Tab tablet computer, incorporating multi-input touch screens. Moreover, the computing device 500 may be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Thus, in one aspect, the present application is directed to a method for detecting an encryption key for malicious encryption. The method includes detecting, by a security agent executed by a computing device, writing of a first item of data to memory of the computing device. The method also includes compressing, by the security agent, a first portion of the first item of data. The method further includes calculating, by the security agent, a ratio of a size of the first portion of the first item of data to a size of the compressed first portion of the first item of data. The method also includes determining that the ratio does not exceed a predetermined threshold; and responsive to the determination that the ratio does not exceed the predetermined threshold, identifying the first item of data as comprising an encryption key. The method also includes, responsive to identifying the first item of data as comprising an encryption key, generating an alert, by the security agent, indicating a likely malicious encryption attempt.

In some implementations, the method includes compressing a second portion of the first item of data, different from the first portion; determining that a compression ratio of the second portion of the first item of data exceeds the predetermined threshold; and compressing the first portion of the first item of data, responsive to the determination that the compression ratio of the second portion of the first item of data exceeds the predetermined threshold.

In some implementations, the method includes determining, by the security agent, that a numeric representation of the first portion of the first item of data is a composite integer; and generating the alert is performed responsive to the determination that the numeric representation of the first portion of the first item of data is a composite integer. In a further implementation, the method includes generating the numeric representation of the first portion of the first item of data via a base-64 decoding. In another further implementation, determining that the numeric representation of the first item of data is a composite integer further comprises: iteratively, for each of a predetermined set of prime numbers, determining that a result of a primality test based on said prime number, the first item of data, and a random number is negative. In yet another further implementation, the method includes determining, by the security agent, that the numeric representation of the first portion of the first item of data lacks factors within a predetermined range; and generating the alert is performed responsive to the determination that the numeric representation of the first portion of the first item of data lacks factors within the predetermined range.

In some implementations, the method includes determining, by the security agent, that the first item of data meets a predetermined size requirement; responsive to the determination that the first item of data meets the predetermined size requirement, decoding the first item of data according to a predetermined encryption key encoding system; and identifying, by the security agent, an absence of an encryption key in the decoded first item of data. Compressing the first portion of the first item of data is performed responsive to identification of the absence of the encryption key in the decoded first item of data.

In some implementations, the method includes detecting writing of the first item of data to a transmission buffer of a network interface of the computing device. In some implementations, the method includes detecting writing of the first item of data to a storage device of the computing device. In some implementations, the method includes determining that a length of the data is within a predetermined range of bytes. In some implementations, the method includes generating a snapshot of system memory, by the security agent; and searching the snapshot for an encryption key.

In some implementations, the method includes identifying, by the security agent, an encryption modulus; and transmitting, by the security agent, the encryption modulus to a remote server, receipt of the encryption modulus triggering the remote server to calculate, for each of one or more previously received encryption moduli in a database, a greatest common denominator. The method also includes receiving, by the security agent from the remote server, a selected greatest common denominator; and calculating, by the security agent from the selected greatest common denominator and the encryption modulus, an encryption key.

In another aspect, the present disclosure is directed to a method for detecting an encryption key for malicious encryption. The method includes detecting, by a security agent executed by a computing device, writing of a first item of data to memory of the computing device. The method also includes identifying, by the security agent, that the first item of data meets a predetermined size requirement. The method also includes, responsive to the identification that the first item of data meets the predetermined size requirement, decoding the first item of data according to a predetermined encryption key encoding system. The method also includes determining, by the security agent, whether the decoded first item of data includes an encryption key. The method also includes, responsive to the decoded first item of data either (i) including an encryption key, or (ii) not including an encryption key, respectively either (i) generating an alert, by the security agent, indicating a likely malicious encryption attempt, or (ii) performing at least one further key detection procedure on the first item of data.

In some implementations, the method includes, responsive to the decoded first item of data not including an encryption key: compressing, by the security agent, a first portion of the first item of data; calculating, by the security agent, a ratio of a size of the first portion of the first item of data to a size of the compressed first portion of the first item of data; determining that the ratio does not exceed a predetermined threshold; and responsive to the determination that the ratio does not exceed the predetermined threshold, generating the alert, by the security agent, indicating a likely malicious encryption attempt.

In some implementations, the method includes determining that the first item of data meets the predetermined size requirement by determining that a length of the data is within a predetermined range of bytes.

In another aspect, the present disclosure is directed to a system for detecting an encryption key for malicious encryption. The system includes a memory unit of a computing device, the memory unit storing a first item of data; and a security agent, executed by a processor of a computing device, configured to detect writing of the first item of data to the memory unit. The security agent is also configured to identify that the first item of data meets a predetermined size requirement. The security agent is also configured to, responsive to the identification that the first item of data meets the predetermined size requirement, decode the first item of data according to a predetermined encryption key encoding system. The security agent is also configured to determine whether the decoded first item of data includes an encryption key. The security agent is also configured to, responsive to the decoded first item of data either (i) including an encryption key, or (ii) not including an encryption key, respectively either (i) generate an alert indicating a likely malicious encryption attempt, or (ii) perform at least one further key detection procedure on the first item of data.

In some implementations, the security agent is also configured to, responsive to the decoded first item of data not including an encryption key, compress a first portion of the first item of data. The security agent is also configured to calculate a ratio of a size of the first portion of the first item of data to a size of the compressed first portion of the first item of data. The security agent is also configured to determine that the ratio does not exceed a predetermined threshold; and responsive to the determination that the ratio does not exceed the predetermined threshold, generate the alert indicating a likely malicious encryption attempt.

In some implementations, the security agent is also configured to determine that the first item of data meets the predetermined size requirement by determining that a length of the data is within a predetermined range of bytes.

In another aspect, the present disclosure is directed to a method for detecting an encryption key for malicious encryption. The method includes receiving, by a factorization host executed by a first computing device, from a second computing device, an encryption modulus. The method also includes calculating, by the factorization host, a greatest common denominator between the received encryption modulus and an additional encryption modulus, received from a third computing device and stored in a moduli database of the first computing device. The method also includes determining that the calculated greatest common denominator between the received encryption modulus and the additional encryption modulus is less than the minimum of either of the received encryption modulus and the additional encryption modulus. The method also includes transmitting, by the first computing device, the calculated greatest common denominator to the second computing device, receipt of the greatest common denominator triggering the second computing device to perform decryption of at least one file using the calculated greatest common denominator.

In some implementations, the method includes receiving a plurality of encryption moduli from a plurality of additional computing devices, by the factorization host; and storing the received plurality of encryption moduli in the moduli database, by the factorization host. In such implementations, calculating the greatest common denominator between the received encryption modulus and the additional encryption modulus further comprises calculating a plurality of greatest common denominators between the received encryption modulus and each of the plurality of encryption moduli stored in the moduli database.

In another aspect, the present disclosure is directed to a system for detecting an encryption key for malicious encryption. The system includes a memory unit of a computing device, the memory unit storing a first item of data; and a security agent, executed by a processor of a computing device, configured to detect writing of the first item of data to the memory unit. The security agent is further configured to, responsive to the detection: compress a first portion of the first item of data; calculate a ratio of a size of the first portion of the first item of data to a size of the compressed first portion of the first item of data; determine that the ratio does not exceed a predetermined threshold; responsive to the determination that the ratio does not exceed the predetermined threshold, identify the first item of data as comprising an encryption key; and responsive to identifying the first item of data as comprising an encryption key, generate an alert indicating a likely malicious encryption attempt.

In some implementations, the security agent is further configured to: determine that a numeric representation of the first portion of the first item of data is a composite integer, and generate the alert, responsive to the determination that the numeric representation of the first portion of the first item of data is a composite integer. In a further implementation, the security agent is further configured to, iteratively, for each of a predetermined set of prime numbers, determine that a result of a primality test based on said prime number, the first item of data, and a random number is negative. In another further implementation, the security agent is further configured to: determine that the numeric representation of the first portion of the first item of data lacks factors within a predetermined range; and generate the alert, responsive to the determination that the numeric representation of the first portion of the first item of data lacks factors within the predetermined range. In still another further implementation, the security agent is further configured to: determine that the first item of data meets a predetermined size requirement; responsive to the determination that the first item of data meets the predetermined size requirement, decode the first item of data according to a predetermined encryption key encoding system; identify an absence of an encryption key in the decoded first item of data; and compress the first portion of the first item of data, responsive to identification of the absence of the encryption key in the decoded first item of data.

In some implementations, the security agent is further configured to detect writing of the first item of data to a transmission buffer of a network interface of the computing device. In some implementations, the security agent is further configured to, responsive to generation of the alert, generate a snapshot of system memory, and search the snapshot for an encryption key. In some implementations, the security agent is further configured to identify an encryption modulus. The system includes a network interface of the computing device configured to: transmit the encryption modulus to a remote server, receipt of the encryption modulus triggering the remote server to calculate, for each of one or more previously received encryption moduli in a database, a greatest common denominator; and receive, from the remote server, a selected greatest common denominator. The security agent is further configured to calculate, from the selected greatest common denominator and the encryption modulus, an encryption key.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed is:

1. A method for detecting and mitigating malicious encryption, comprising:
    detecting, by a security agent executed by a computing device, a write operation for a first item of data;
    detecting, by the security agent, an encryption key in the first item of data based on the application of one or more tests to the first item of data, wherein the plurality of tests includes:
        attempting to decode, by the security agent, the first item of data and analyzing the decoded data for the presence of predetermined strings or formats associated with an encryption key, and
        determining if a numeric representation of the first item of data is a composite number and analyzing, by the security agent, the first item of data by attempting at least a partial factorization of the numeric representation; and
    responsive to detecting an encryption key in the first item of data based on the application of the one or more tests:
        generating an alert, by the security agent, indicating a likely malicious encryption attempt, and
        taking, by the security agent, one or more actions to mitigate the malicious encryption attempt.

2. The method of claim 1, wherein, prior to applying the one or more tests to the first item of data, determining, by the security agent, if the first item of data matches a predetermined size range.

3. The method of claim 2, wherein if it is determined that the first item of data matches the predetermined size range, assuming that the first item of data includes an encryption key.

4. The method of claim 2, wherein if it is determined that the first item of data does not match the predetermined size range, continuing with the application of one or more tests to the first item of data.

5. The method of claim 1, wherein attempting to decode the first item of data further comprises decoding the first item of data according to a predetermined encryption key encoding system.

6. The method of claim 1, wherein the one or more tests further includes examining the entropy of the first item.

7. The method of claim 6, wherein examining the entropy of the first item of data further comprises:
    compressing a first portion of the first item of data;
    calculating a ratio of a size of the first portion of the first item of data to a size of a compressed first portion of the first item of data;
    determining that the ratio does not exceed a predetermined threshold; and
    responsive to the determination that the ratio does not exceed the predetermined threshold, identifying the first item of data as comprising an encryption key.

8. The method of claim 1, wherein the numeric representation of the first portion of the first item of data is generated via a base-64 decoding.

9. The method of claim 1, wherein the partial factorization of the numeric representation is attempted via one or more integer-factorization algorithms.

10. The method of claim 1, wherein detecting the write operation for the first item of data further comprises detecting writing of the first item of data to a transmission buffer of a network interface of the computing device.

11. A system for detecting and mitigating malicious encryption, comprising:
- a memory unit of a computing device, the memory unit storing a first item of data; and
- a security agent, executed by a processor of a computing device, configured to detect a write operation for the first item of data to the memory unit, and responsive to the detection:
  - detecting an encryption key in the first item of data based on the application of one or more tests to the first item of data, wherein the plurality of tests includes:
    - attempting to decode the first item of data and analyzing the decoded data for the presence of predetermined strings or formats associated with an encryption key, and
    - determining if a numeric representation of the first item of data is a composite number and analyzing the first item of data by attempting at least a partial factorization of the numeric representation; and
  - responsive to detecting an encryption key in the first item of data based on the application of the one or more tests:
    - generating an alert indicating a likely malicious encryption attempt, and
    - taking one or more actions to mitigate the malicious encryption attempt.

12. The system of claim 11, wherein, prior to applying the one or more tests to the first item of data, determining, by the security agent, if the first item of data matches a predetermined size range.

13. The system of claim 12, wherein if it is determined that the first item of data matches the predetermined size range, assuming that the first item of data includes an encryption key.

14. The system of claim 12, wherein if it is determined that the first item of data does not match the predetermined size range, continuing with the application of one or more tests to the first item of data.

15. The method of claim 11, wherein attempting to decode the first item of data further comprises decoding the first item of data according to a predetermined encryption key encoding system.

16. A method for mitigating malicious encryption, comprising:
- detecting, by a security agent executed by a computing device, a likely malicious encryption attempt on the computing device; and
- responsive to detecting the likely malicious encryption attempt on the computing device, taking, by the security agent, one or more actions to mitigate the malicious encryption attempt, wherein the one or more actions include:
  - generating an alert indicating the likely malicious encryption attempt,
  - preventing write commands to memory of the computing device,
  - creating one or more backups of data on the computing device,
  - generating a snapshot of system memory, and
  - searching the one or more backups and generated snapshot for an encryption key.

17. The method of claim 16, further comprising, if an encryption key is found, decrypting any encrypted files stored on the computing device.

18. The method of claim 16, further comprising, if an encryption key is not found, attempting to calculate an encryption key and using the calculated encryption key to decrypt any encrypted files stored on the computing device.

19. The method of claim 18, wherein the encryption key is identified via factoring by collision.

20. The method of claim 16, wherein the one or more actions includes preventing the deletion of data on the computing device.

* * * * *